(12) United States Patent
Mestery et al.

(10) Patent No.: US 10,749,790 B2
(45) Date of Patent: Aug. 18, 2020

(54) MULTICAST-BASED CONTENT DISTRIBUTION FOR IOT NETWORKS USING BIT INDEX EXPLICIT REPLICATION (BIER)

(71) Applicant: Cisco Technology, Inc., San Jose, CA (US)

(72) Inventors: Kyle Andrew Donald Mestery, Woodbury, MN (US); Ian Wells, Milpitas, CA (US); Gregory Shepherd, Eugene, OR (US)

(73) Assignee: Cisco Technology, Inc., San Jose, CA (US)

( * ) Notice: Subject to any disclaimer, the term of this patent is extended or adjusted under 35 U.S.C. 154(b) by 24 days.

(21) Appl. No.: 16/247,664

(22) Filed: Jan. 15, 2019

(65) Prior Publication Data
US 2020/0228439 A1    Jul. 16, 2020

(51) Int. Cl.
| H04L 12/28 | (2006.01) |
| H04L 12/761 | (2013.01) |
| H04L 12/707 | (2013.01) |
| H04L 12/721 | (2013.01) |
| H04L 12/747 | (2013.01) |

(52) U.S. Cl.
CPC ............ H04L 45/16 (2013.01); H04L 45/24 (2013.01); H04L 45/66 (2013.01); H04L 45/742 (2013.01)

(58) Field of Classification Search
CPC ......... H04L 45/16; H04L 45/24; H04L 45/66; H04L 45/742
USPC ................. 370/390, 392, 393, 400, 407–40; 709/252
See application file for complete search history.

(56) References Cited

U.S. PATENT DOCUMENTS

| 5,457,808 A * | 10/1995 | Osawa | H04B 7/18595 375/E7.016 |
| 7,707,300 B1 * | 4/2010 | Champagne | H04L 12/4625 709/231 |
| 7,864,769 B1 | 1/2011 | Woo et al. | |
| 8,594,089 B2 | 11/2013 | Lejeune et al. | |
| 9,432,205 B2 | 8/2016 | Tian et al. | |
| 9,544,240 B1 | 1/2017 | Przygienda et al. | |
| 9,749,410 B2 | 8/2017 | Thubert et al. | |

(Continued)

OTHER PUBLICATIONS

Xie, et al., "RSVP-TE Extensions for P2MP-based BIER", Network Working Group Internet-Draft, <draft-xie-mpls-rsvp-bier-extension-00>, Mar. 5, 2018, 13 pages, IETF Trust.

(Continued)

*Primary Examiner* — Thai D Hoang
(74) *Attorney, Agent, or Firm* — Behmke Innovation Group LLC; Kenneth J. Heywood; Jonathon P. Western

(57) ABSTRACT

In one embodiment, a local content hub device in a network receives content for distribution to a plurality of nodes in the network. The content is sent to the local content hub via a wide area network (WAN) using bit index explicit replication (BIER) messaging. The local content hub device caches the content and multicasts the cached content to the plurality of nodes in the network. The local content device determines that at least one of the plurality of nodes in the network did not receive the multicast content. The local content device retransmits the content to at least one of the plurality of nodes in the network that did not receive the multicast content.

20 Claims, 6 Drawing Sheets

(56) References Cited

U.S. PATENT DOCUMENTS

| | | | |
|---|---|---|---|
| 9,900,169 B2 | 2/2018 | Thubert et al. | |
| 2001/0048671 A1* | 12/2001 | Kelly | H01Q 1/1257 |
| | | | 370/316 |
| 2009/0064248 A1* | 3/2009 | Kwan | H04L 12/1868 |
| | | | 725/109 |
| 2015/0039754 A1* | 2/2015 | Gupta | H04L 43/0864 |
| | | | 709/224 |
| 2016/0182432 A1* | 6/2016 | De | H04L 51/18 |
| | | | 709/204 |
| 2018/0035442 A1* | 2/2018 | Jin | H04L 1/1887 |

OTHER PUBLICATIONS

Routing Over Low power and Lossy networks (roll); https://datatracker.ietf.org/wg/roll/about/<https://urldefense.proofpoint.com/v2/url?u=https-3A_datatracker.ietf.org_wg_roll_about_&d-DwQGaQ&c=euGZstcaTDIlvimEN8b7jXrwqOf-v5A_CdpgnVfiiMM&r=CHWfKrKb-wva8zsgybLGI2FJd4ZHG5AoqbfHmEKm2UQ&m=JLSNChw-RS8lxh4SEPCujlATPgoRlfAsFSC2CyBxl5A&s=aQ1L6dBBh_ jSTQvmTF39NuDE1IHTq0Nd-rFOVvPV4Oo&e=>; IETF Datatracker | Version 6.87.3.p. 1 | Nov. 3, 2018.

Wijnands et al. "Multicast Using Bit Index Explicit Replication (BIER)" Internet Engineering Task Force (IETF); Nov. 2017; pp. 1-43.

* cited by examiner

MULTICAST-BASED CONTENT DISTRIBUTION FOR IOT NETWORKS USING BIT INDEX EXPLICIT REPLICATION (BIER)

TECHNICAL FIELD

The present disclosure relates generally to computer networks, and, more particularly, to multicast-based content distribution for Internet of Things (IoT) networks using bit index explicit replication (BIER).

BACKGROUND

The Internet of Things, or "IoT" for short, represents an evolution of computer networks that seeks to connect many everyday objects to the Internet. Notably, there has been a recent proliferation of "smart" devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room, when a person enters the room.

The number of IoT nodes in any given network deployment is rapidly increasing, with some deployments including hundreds or even thousands of IoT nodes, today. This increase in the number of nodes on the network also places a much larger load on the network in terms of bandwidth consumption, onboarding, software updating, and the like.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
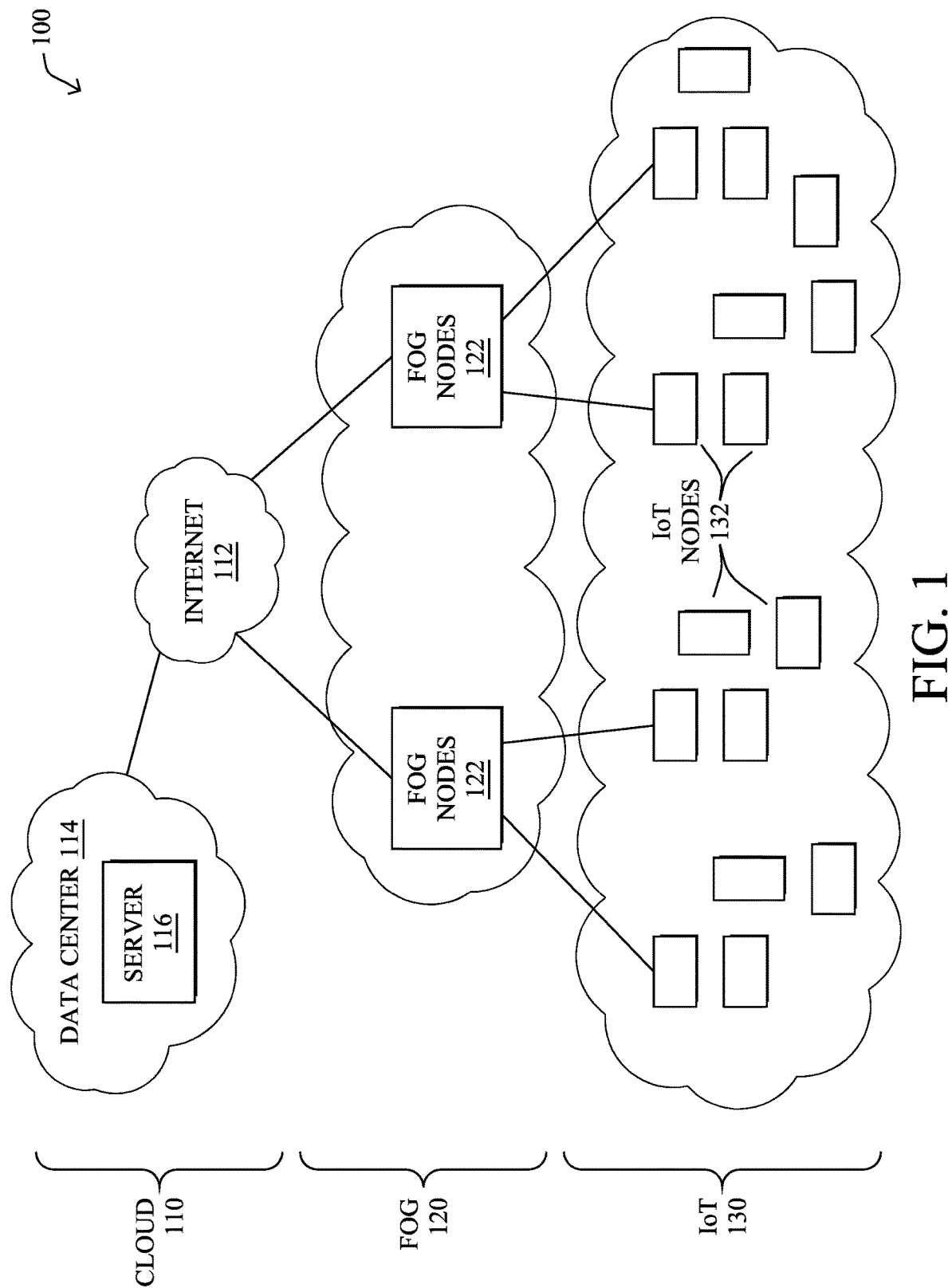
FIG. 1 illustrates an example computer network.

According to one or more embodiments of the disclosure, a local content hub device in a network receives content for distribution to a plurality of nodes in the network. The content is sent to the local content hub via a wide area network (WAN) using bit index explicit replication (BIER) messaging. The local content hub device caches the content and multicasts the cached content to the plurality of nodes in the network. The local content device determines that at least one of the plurality of nodes in the network did not receive the multicast content. The local content device retransmits the content to the at least one of the plurality of nodes in the network that did not receive the multicast content.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, a fog node 122 may operate as a root node for IoT nodes 132 in a local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
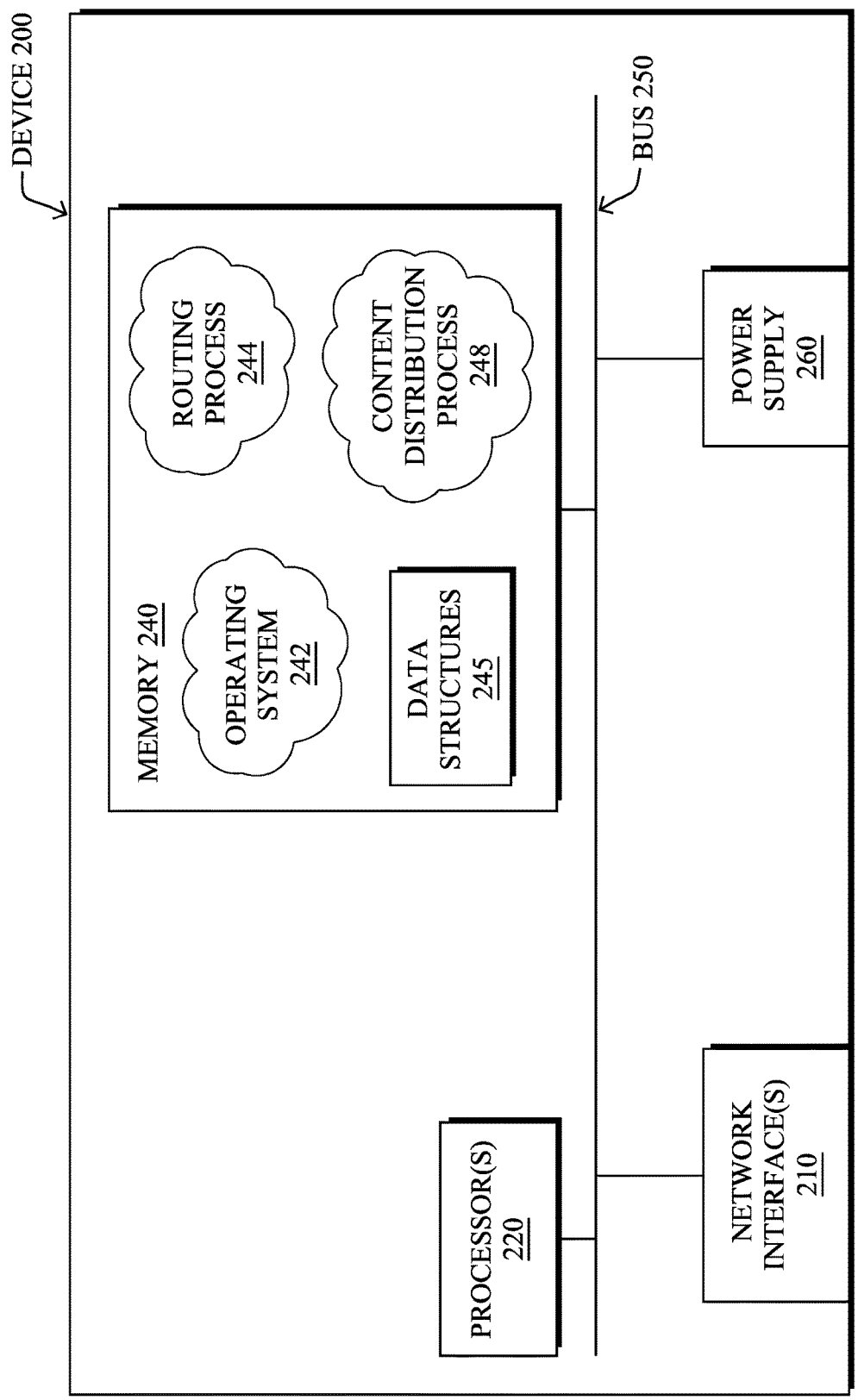
FIG. 2 illustrates an example network device.

FIG. 2 is a schematic block diagram of an example computing device 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for fog modules using PLC, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative routing process/services 244 and/or a content distribution process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process/services 244 include computer executable instructions executed by processor 220 to perform functions provided by one or more routing protocols, such as an Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Another example protocol that routing process 244 may implement, particularly in the case of LLN mesh networks, is the Routing Protocol for Low Power and Lossy (RPL), which provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

In some embodiments, routing process 244 may also leverage Bit Index Explicit Replication (BIER), as outlined in the Internet Engineering Task Force (IETF) Request for Comments (RFC) 8279 entitled "Multicast Using Bit Index Explicit Replication by Wijnands et al. For example, BIER may be used in a LLN as a compression technique that maps an IPv6 address or other network address of a device/node into a bit position in a bitmap, according to various embodiments. For example, consider the case in which the network includes nodes A-K. In such a case, the Root node of the LLN may negotiate with nodes A-K to allocate a bit position per node address, with only one address per node. Thus, nodes A-K may be represented by a bitmap having eleven bits, as shown in Table 1 below:

TABLE 1

| Node | Bit Position | Bitmap |
|------|--------------|-------------|
| A | 1 | 10000000000 |
| B | 2 | 01000000000 |
| C | 3 | 00100000000 |
| D | 4 | 00010000000 |
| E | 5 | 00001000000 |
| F | 6 | 00000100000 |
| G | 7 | 00000010000 |
| H | 8 | 00000001000 |
| I | 9 | 00000000100 |
| J | 10 | 00000000010 |
| K | 11 | 00000000001 |

Using the above bit assignments, multicasting can be performed easily by performing a logical AND between addresses. For example, to multicast a packet to both nodes A and C, their corresponding bitmaps in Table 1 can be combined to form '10100000000.'

As noted above, the number of IoT nodes in any given network is rapidly increasing, placing greater demands on the network in terms of bandwidth consumption, onboarding, software updating, and the like.

Multicast-Based Content Distribution for IoT Networks Using BIER

The techniques introduced herein allow for the onboarding and updating of IoT nodes in a network using Layer 2 multicast for local devices and BIER messaging for replication of the multicast packets across any number of other Layer 2 networks. In further aspects, the techniques herein provide for a content cache device in the local Layer 2 network to serve the content to the IoT nodes in the network and respond to unicast content requests from the nodes. The resulting system allows the content to be used both locally on the Layer 2 IoT network, as well as across the WAN for remote Layer 2 IoT networks.

Specifically, according to one or more embodiments of the disclosure as described in detail below, a local content hub device in a network receives content for distribution to a plurality of nodes in the network. The content is sent to the local content hub via a wide area network (WAN) using bit index explicit replication (BIER) messaging. The local content hub device caches the content and multicasts the cached content to the plurality of nodes in the network. The local content device determines that at least one of the plurality of nodes in the network did not receive the multicast content. The local content device retransmits the content to at least one of the plurality of nodes in the network that did not receive the multicast content.

Illustratively, the techniques described herein may be performed by hardware, software, and/or firmware, such as in accordance with the content distribution process 248, which may include computer executable instructions executed by the processor 220 (or independent processor of interfaces 210) to perform functions relating to the techniques described herein, e.g., in conjunction with routing process 244.

Operationally, the techniques herein introduce a methodology for distributing content, such as software updates or onboarding information, to any number of IoT nodes across any number of local networks. In general, the techniques herein leverage (Layer 2) multicasting for purposes of distributing content to IoT nodes, while still taking into account the fact that multicasting is typically unreliable. More specifically, the content caching and distribution techniques introduced herein provide a scalable way to reach into the hundreds, or even thousands, of IoT nodes for purposes of commanding and controlling the nodes, onboarding them onto the network, and distributing software updates to them.

Figure 3A:
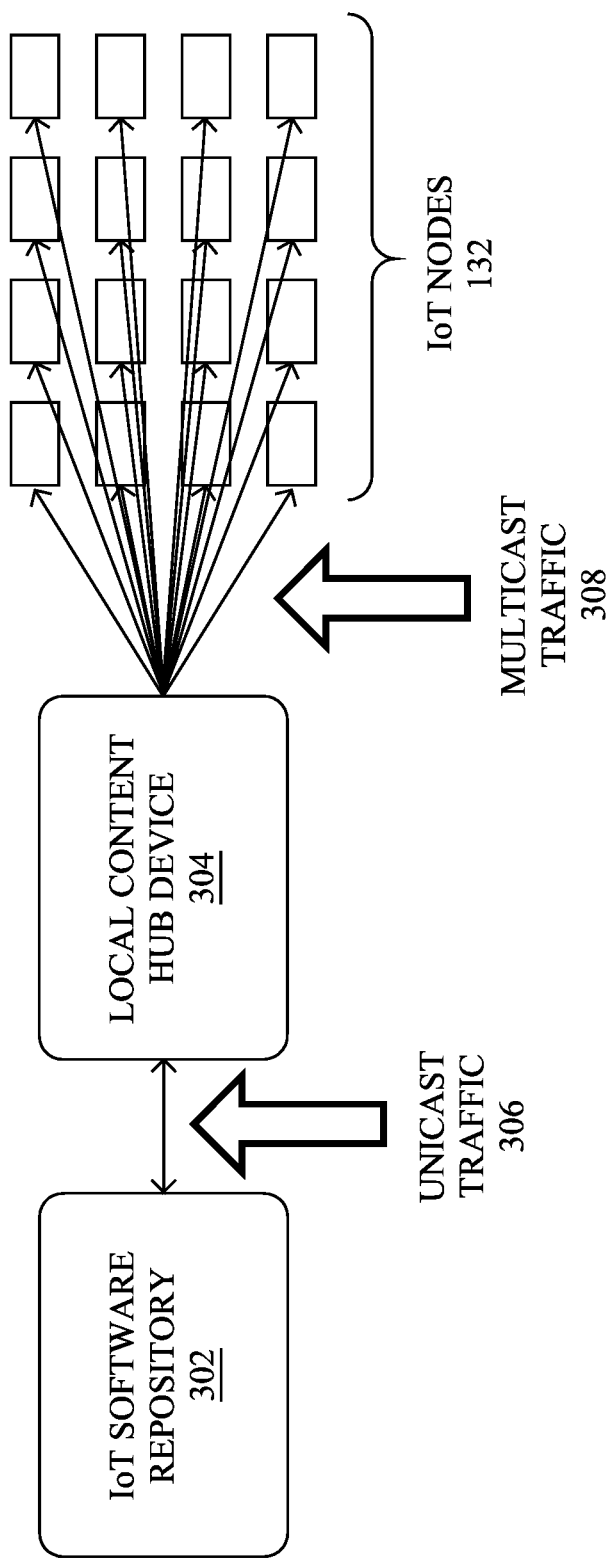
FIGS. 3A-3C illustrate examples of distributing content to IoT nodes.
Figure 3B:
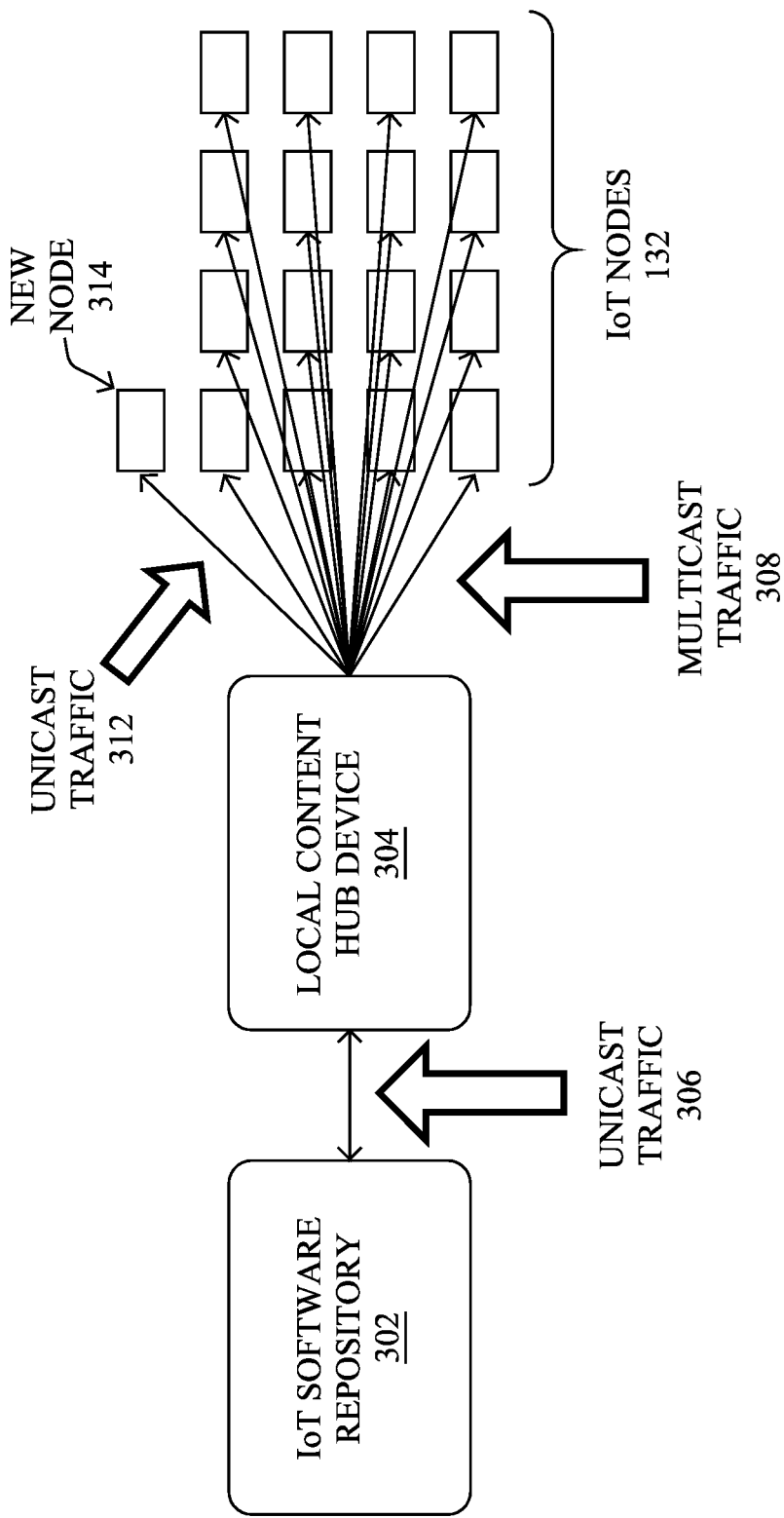
Figure 3C:
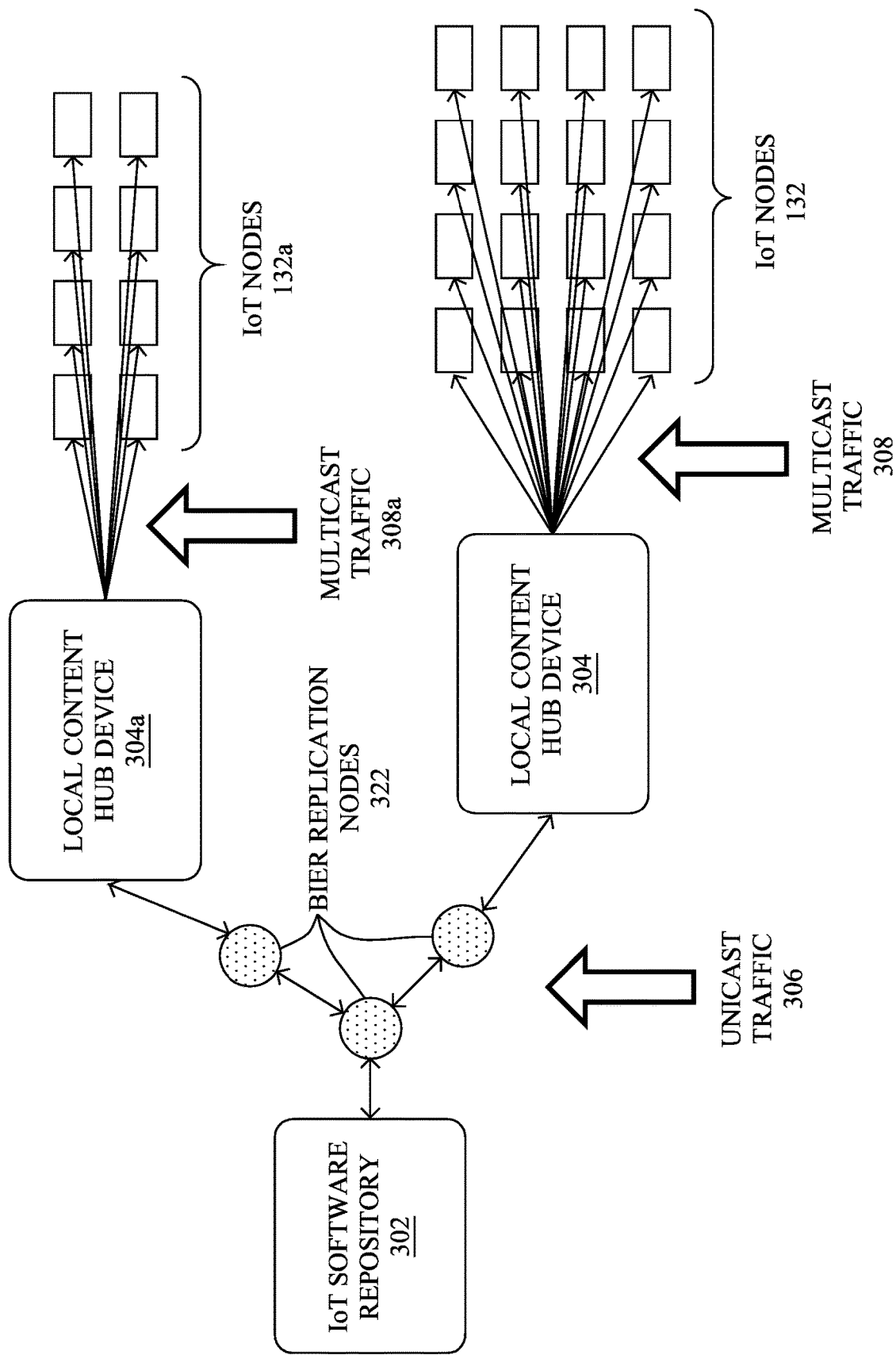

FIGS. 3A-3C illustrate examples of distributing content to IoT nodes using the techniques herein, according to various embodiments. As shown, assume that there exists a set of IoT nodes 132, described previously, a local content hub device 304 (e.g., a fog node 122), and an IoT software repository 302, which may be local or remote to the network of IOT nodes 132 or remote (e.g., as part of cloud layer 110).

In general, local content hub device 304 and IoT nodes 132 may belong to the same local, Layer 2 network. Accordingly, when content is to be distributed to IoT nodes 132 from IoT software repository 302, repository 302 may send the content as unicast traffic 306 to local content hub device 304 for distribution to IoT nodes 132. In turn, local content hub device 304 may cache the content and send the content to IoT nodes 132 via Layer 2 multicast traffic 308. Since multicast is unreliable, caching the content on local content hub device 304 allows any of IoT nodes 132 to request that local content hub device 304 retransmit the content to them. Using this approach, local content hub device 304 can update order-N number of IoT nodes 132 with mostly order-1 properties on distribution.

As shown in FIG. 3B, assume that a new IoT node 314 now joins the local network of IoT nodes 132 and local content hub device 304. In such a case, the new node 314 may obtain the content from local content hub device 304 by sending a unicast request to local content hub device 304 and, in turn, local content hub device 304 may return the content to new node 314 via unicast traffic 312. For example, new node 314 may request onboarding to the local network or, alternatively, for a firmware update cached by local content hub device 304.

According to various embodiments, the BIER protocol can be used to replicate the content over the WAN using a replication tree, in order to minimize traffic expended and without requiring service provider assistance. The advantage of doing so is that IoT software repository 302 can be used to send the content to both local and remote sites, leveraging multicasting in the local network, when possible, and BIER to distribute the content between sites/local networks.

FIG. 3C illustrates an example of the distribution of content across multiple local networks. Continuing the previous examples in FIGS. 3A-3B, assume that there also exists a second set of IoT nodes 132a located in a different Layer 2 network than that of IoT nodes 132. Similar to the local network of IoT nodes 132, another local content hub device 304a may be deployed to the local network of IoT nodes 132a, to distribute content to IoT nodes 132a via multicast traffic 308a.

On the WAN side, the content can be distributed to local content hub devices 304, 304a using BIER messaging. While BIER may necessitate replication of the messages, the replication can, in some embodiments, be achieved through the use of replication nodes 322. In general, replication nodes 322 can operate very efficiently at the low levels of the network stack, where the overhead of processing the networking stack is much lower. Alternatively, the above approach can be reused to distribute the content: the update is multicast out by IoT software repository 302, and each node 322 can refer to the source or to intermediate caches for lost packets.

Thus, during operation, assume that IoT software repository 302 is to send out a firmware update to IoT nodes 132 and 132a, located in different local networks. To do so, IoT software repository 302 may send the firmware update to BIER replication nodes 322 via BIER packets which, in turn, replicate the packets and send them on to local content hub devices 304 and 304a. From there, local content hub devices 304, 304a may send the firmware update to IoT nodes 132 and 132a in their local networks, respectively, using Layer 2 multicasting. In addition, local content hub devices 304, 304a may each cache the firmware update. If any of the nodes 132, 132a fail to receive the update, they can then request the update directly from their corresponding local content hub device (e.g., via a unicast retransmission of the update).

As would be appreciated, the above approach offers the following advantages for handling IoT device on-boarding and software upgrades over existing techniques:

1. By using multicast, the number of nodes 132 or 132a that can be onboarded at the same time to the same Layer 2 network can be scaled, accordingly, without creating significant overhead on the network. The same holds true when distributing software updates to IoT nodes 132, 132a.
2. By utilizing a local content hub device on the same Layer 2 network as the IoT nodes, this allows nodes 132, 132a to send unicast requests to its corresponding local content hub device to be onboarded or have its software updated.
3. The local content hub devices 304, 304a support both the unicast and multicast aspects of the IoT node on-boarding and software upgrades.
4. By utilizing the BIER protocol, IoT software can be efficiently distributed to multiple local content hub devices, which in turn can onboard and upgrade thousands of IoT nodes on different L2 networks using multicast.

Figure 4:
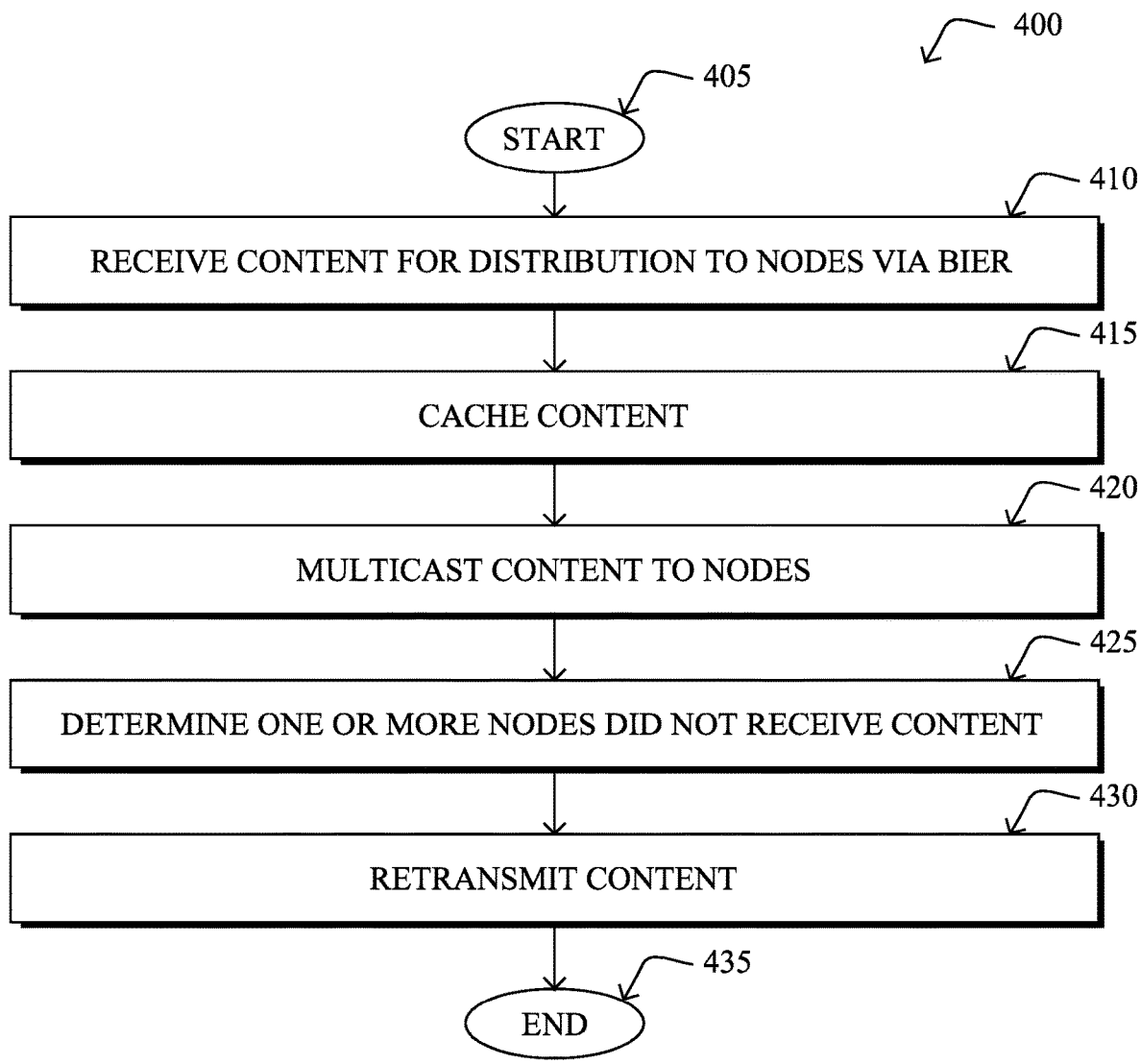
FIG. 4 illustrates an example simplified procedure for multicast-based content distribution for IoT networks using bit index explicit replication (BIER).

FIG. 4 illustrates an example simplified procedure for multicast-based content distribution for IoT networks using bit index explicit replication (BIER) in a network, in accordance with one or more embodiments described herein. For example, a non-generic, specifically configured device (e.g., device 200) may perform procedure 400 by executing stored instructions (e.g., process 248), such as by functioning as a local content hub in a network. The procedure 400 may start at step 405, and continues to step 410, where, as described in greater detail above, the local content hub device may receive content for distribution to a plurality of nodes in the network. Such a network may be, for example, a Layer 2 network to which the plurality of nodes belongs. In various embodiments, the content may be sent to the local content hub via a WAN using BIER messaging, either directly from a central repository or via any number of BIER replication nodes.

At step 415, as detailed above, the local content hub device may cache the content. By storing the content local to the same network of the nodes, this can greatly reduce the amount of traffic needed for purposes of sending the content to new nodes on the network and/or any of the plurality of nodes that fail to receive the content.

At step 420, the local content hub device may multicast the cached content to the plurality of nodes in the network, as described in greater detail above. For example, the local content hub device may send the content via Layer 2 multicast messages to the plurality of nodes. By sending the cached content via multicast, this allows the content to be efficiently distributed to any number of IoT nodes at once. For example, the content may include onboarding information, thereby allowing a large number of IoT nodes to onboard to the network at once. Similarly, the content may include a software update for the nodes that can be pushed en masse to the nodes.

At step 425, as detailed above, the local content hub device may determine that at least one of the plurality of nodes in the network did not receive the multicast content. Notably, multicasting is notoriously unreliable, meaning that it is entirely possible that one of the plurality of nodes will fail to receive the content distributed in step 420. In such cases, the node(s) that failed to receive the content may request the content, to indicate the failure.

At step 430, the local content hub device may retransmit the content to the at least one of the plurality of nodes in the network that did not receive the multicast content, as described in greater detail above. While this does increase the amount of bandwidth consumed in the network, it is expected that only a small percentage of the plurality of nodes will fail to receive the multicast content. Procedure 400 then ends at step 435.

It should be noted that while certain steps within procedure 400 may be optional as described above, the steps shown in FIG. 4 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for distributing content, such as onboarding information or software updates, to a large number of IoT nodes, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    receiving, at a local content hub device of a network, content for distribution to a plurality of nodes in the network, wherein the content is sent to the local content hub via a wide area network (WAN) using bit index explicit replication (BIER) messaging;
    caching, by the local content hub device, the received content;
    multicasting, by the local content hub device, the cached content to the plurality of nodes in the network;
    determining, by the local content hub device, that at least one of the plurality of nodes in the network did not receive the multicast content; and
    retransmitting, by the local content hub device, the content to the at least one of the plurality of nodes in the network that did not receive the multicast content.

2. The method as in claim 1, wherein the network is a Layer 2 network, and wherein the local content hub device multicasts the cached content to the plurality of nodes via Layer multicasting.

3. The method as in claim 1, wherein the local content hub device receives the content from a BIER replication node.

4. The method as in claim 1, wherein the content is sent to the local content hub device by a software repository that distributes the content to a plurality of local content hubs in different networks via the WAN.

5. The method as in claim 1, wherein the content comprises onboarding data to onboard the plurality of nodes to the network.

6. The method as in claim 1, wherein the content comprises onboarding data to onboard the plurality of nodes to the network.

7. The method as in claim 1, wherein the content comprises onboarding data to onboard the plurality of nodes to the network.

8. The method as in claim 1, further comprising:
    sending, by the local content hub device, the content to a new node in the network via unicast messaging.

9. The method as in claim 1, wherein the nodes in the network are Internet of Things (IoT) nodes.

10. An apparatus, comprising:
    one or more network interfaces to communicate with a network;
    a processor coupled to the network interfaces and configured to execute one or more processes; and
    a memory configured to store a process executable by the processor, the process when executed configured to:
        receive content for distribution to a plurality of nodes in the network, wherein the content is sent to the local content hub via a wide area network (WAN) using bit index explicit replication (BIER) messaging;
        cache the received content;
        multicast the cached content to the plurality of nodes in the network;
        determine that at least one of the plurality of nodes in the network did not receive the multicast content; and
        retransmit the content to the at least one of the plurality of nodes in the network that did not receive the multicast content.

11. The apparatus as in claim 10, wherein the network is a Layer 2 network, and wherein the local content hub device multicasts the cached content to the plurality of nodes via Layer 2 multicasting.

12. The apparatus as in claim 10, wherein the local content hub device receives the content from a BIER replication node.

13. The apparatus as in claim 10, wherein the content is sent to the local content hub device by a software repository that distributes the content to a plurality of local content hubs in different networks via the WAN.

14. The apparatus as in claim 10, wherein the content comprises onboarding data to onboard the plurality of nodes to the network.

15. The apparatus as in claim 10, wherein the content comprises onboarding data to onboard the plurality of nodes to the network.

16. The apparatus as in claim 10, wherein the content comprises onboarding data to onboard the plurality of nodes to the network.

17. The apparatus as in claim 10, wherein the process when executed is further configured to:
    send the content to a new node in the network via unicast messaging.

18. The apparatus as in claim 10, wherein the nodes in the network are Internet of Things (IoT) nodes.

19. A tangible, non-transitory, computer-readable medium storing program instructions that cause a local content device in a network to execute a process comprising:
    receiving, at the local content hub device, content for distribution to a plurality of nodes in the network, wherein the content is sent to the local content hub via a wide area network (WAN) using bit index explicit replication (BIER) messaging;
    multicasting, by the local content hub device, the cached content to the plurality of nodes in the network;
    caching, by the local content hub device, the received content;
    determining, by the local content hub device, that at least one of the plurality of nodes in the network did not receive the multicast content; and retransmitting, by the local content hub device, the content to the at least one of the plurality of nodes in the network that did not receive the multicast content.

20. The computer-readable medium as in claim 19, wherein the content comprises onboarding data to onboard the plurality of nodes to the network.

\* \* \* \* \*

UNITED STATES PATENT AND TRADEMARK OFFICE
CERTIFICATE OF CORRECTION

PATENT NO. : 10,749,790 B2
APPLICATION NO. : 16/247664
DATED : August 18, 2020
INVENTOR(S) : Kyle Andrew Donald Mestery et al.

Page 1 of 1

It is certified that error appears in the above-identified patent and that said Letters Patent is hereby corrected as shown below:

In the Claims

Column 9, Line 52, please amend as shown:
Layer 2 multicasting.

Signed and Sealed this
Twenty-second Day of December, 2020

Andrei Iancu
*Director of the United States Patent and Trademark Office*